United States Patent [19]

Kondo

[11] Patent Number: 5,068,541
[45] Date of Patent: Nov. 26, 1991

[54] SURFACE ROUGHNESS MEASURING METHOD AND APPARATUS UTILIZING TRUNCATED CONICAL LENS AND OBJECTIVE LENS

[75] Inventor: Michio Kondo, Nagoya, Japan
[73] Assignee: Brother Kogyo Kabushiki Kaisha, Aichi, Japan
[21] Appl. No.: 567,741
[22] Filed: Aug. 15, 1990

[30] Foreign Application Priority Data

Aug. 23, 1989 [JP] Japan .................................. 1-216273

[51] Int. Cl.$^5$ ............................................ G01N 21/86
[52] U.S. Cl. .................................. 250/571; 250/225; 356/349; 356/358
[58] Field of Search ................ 250/225, 571, 572, 562; 356/357, 358, 381, 349

[56] References Cited

U.S. PATENT DOCUMENTS

| | | | |
|---|---|---|---|
| 3,624,605 | 11/1971 | Aagard | 250/571 |
| 3,930,732 | 1/1976 | Holly | 250/225 |
| 3,999,865 | 12/1976 | Milam et al. | 250/572 |
| 4,061,427 | 12/1977 | Fletcher et al. | 250/571 |
| 4,442,455 | 4/1984 | Huignard et al. | 356/349 |
| 4,708,481 | 11/1987 | Mori et al. | 356/358 |
| 4,984,891 | 1/1991 | Miyzaki et al. | 356/358 |
| 4,995,726 | 2/1991 | Fujita et al. | 356/349 |

Primary Examiner—David C. Nelms
Assistant Examiner—S. Allen
Attorney, Agent, or Firm—Oliff & Berridge

[57] ABSTRACT

An apparatus for measuring surface roughness or profile of a subject, including a truncated conical lens having a central circular flat surface and a conical surface, and an objective lens disposed in series with the truncated conical lens. Parallel rays of light are transmitted through the truncated conical and objective lenses and are thereby converted into a first and a second measuring beam for irradiating respectively a minute spot on the surface of the subject and an annular spot surrounding the minute spot. An optical arrangement is provided for preparing a reference beam whose frequency is different from that of the measuring beams, and effecting interference between the reference beam with each of the first and second measuring beams, to produce two beat beams, which are converted into electrical beat signals. A height variation or roughness of the subject surface is determined based on a phase difference between the two beat signals.

11 Claims, 4 Drawing Sheets

FIG.1

MEASURING CIRCUIT

SURFACE ROUGHNESS MEASURING METHOD AND APPARATUS UTILIZING TRUNCATED CONICAL LENS AND OBJECTIVE LENS

BACKGROUND OF THE INVENTION

1. Field of the Invention

The present invention relates to a method and an apparatus for effecting non-contact measurement of a profile or roughness of a surface of a subject, and more particularly to such method and apparatus which uses two light beams for irradiating a minute center spot on the subject surface and an annular spot surrounding the center spot.

2. Discussion of the Prior Art

For measuring the roughness or smoothness or profile of a surface of a subject under examination, without an influence of mechanical vibrations of the subject surface, a non-contact optical measuring system is available. This system usually employs a first light beam for irradiating a relatively small or minute spot on the subject surface, and a second light beam for irradiating a larger spot which is concentric with and has a large diameter than the minute spot. Generally, the larger spot has a diameter of at least 100 μm. The first and second light beams concurrently irradiating the minute and larger spots are reflected by the subject surface, and the reflected light beams interfere with each other so as to produce a beat beam whose beat frequency varies as the subject surface is scanned by the beams. The beat beam is converted into an electrical beat signal, on which a variation in the surface height or level is determined.

The light beam reflected by the minute spot is influenced by both a roughness or height variation and mechanical vibrations of the subject surface. On the other hand, since the surface height variations in the larger spot with a diameter of about 100 μm are averaged to a value substantially equal to zero, the light beam reflected by the larger spot does not include information indicative of the surface height variation, and is influenced by only the mechanical vibrations of the subject surface. As the influences of the mechanical vibrations on the two reflected light beams are almost equal to each other, the beat beam or beat signal produced as a result of interference of the two light beams is substantially free of an influence by the mechanical vibrations of the subject surface, and therefore accurately represents a variation in the surface height or level of the subject.

Conventionally, a double-focus objective lens which has two foci is used to produce the light beams for concurrently irradiating the minute spot and the larger spot on the subject surface. When the surface under examination is placed in one of the two focal planes of the double-focus objective, one of two orthogonally polarized components of a linearly polarized light is reflected from the minute spot, while the other component is out of focus on the subject surface and is reflected from the larger spot. Thus, the minute focused spot and the large defocused spot are formed on the subject surface.

The double-focus objective lens is formed by cutting an expensive doubly-refracting material such as calcite and crystalline quartz, such that the crystal is oriented with respect to the direction of propagation of the incident light. The cut crystal is ground into a desired lens configuration. Accordingly, the double-focus objective lens is considerably expensive.

SUMMARY OF THE INVENTION

It is therefore an object of the present invention to provide a method of measuring a roughness or profile of a subject surface, by irradiating a minute spot and a concentric larger spot on the subject surface, without using a double-focus lens.

A second object of the invention is to provide an inexpensive surface roughness measuring apparatus which does not use a double-focus lens.

The first object may be achieved according to one aspect of the present invention, which provides a method of measuring a roughness of a surface of a subject, comprising the steps of: (i) disposing a truncated conical lens and an objective lens in series with each other along an optical path, the truncated conical lens having a central circular flat surface and a conical surface which extends from a periphery of the central circular flat surface; (ii) generating and directing parallel rays of light such that the parallel rays of light are transmitted through the truncated conical lens and the objective lens and are thereby converted into a first measuring beam which irradiates a minute spot on the surface of the subject, and a second measuring beam which irradiates an annular spot which surrounds the minute spot; (iii) generating a reference beam having a frequency different from that of the first and second measuring beams, and directing the reference beam such that the reference beam interferes with each of the first and second measuring beams reflected by the surface of the subject, so as to produce two beat beams; (iv) converting the two beat beams into respective two electrical beat signals; and (v) determining a height variation of the surface of the subject, based on a phase difference between the two electrical beat signals.

The second object may be achieved according to a second aspect of the present invention, which provides an apparatus for measuring a roughness of a surface of a subject, comprising: (a) a first optical assembly including means for generating parallel rays of light, a truncated conical lens which has a central circular flat surface, and a conical surface which extends from a periphery of the central circular flat surface of the truncated conical lens, and an objective lens disposed in series with the truncated conical lens, the first optical assembly being disposed such that the parallel rays of light are transmitted through the truncated conical lens and the objective lens and are thereby converted into a first measuring beam for irradiating a minute spot on the surface of the subject, and a second measuring beam for irradiating an annular spot which surrounds the minute spot; (b) a second optical assembly including means for preparing a reference beam having a frequency different from that of the first and second measuring beams, the second optical assembly causing the reference beam to interfere with each of the first and second measuring beams reflected from the surface of the subject, so as to produce two beat beams; (c) converting means for converting the two beat beams into respective two electrical beat signals; and (d) determining means including a phase difference detector for detecting a phase difference between the two electrical beat signals, the determining means determining a height variation of the surface of the subject, based on the detected phase difference.

In the method and apparatus of the present invention described above, the beat beam produced as a result of interference between the reference beam and the first measuring beam reflected by the minute spot is influenced by both the surface roughness or height variation of the subject and the mechanical vibrations of the subject surface. On the other hand, the beat beam produced as a result of interference between the reference beam and the second measuring beam reflected by the annular spot is influenced by only the mechanical vibrations of the subject surface, since the height variations in the local areas of the larger annular spot are averaged to a value close to zero. Because the influences of the mechanical vibrations on the two beat beams are almost equal to each other, the phase difference between the two electrical beat signals corresponding to the two beat beams represents only the surface height variation of the subject, with substantially no influence of the mechanical vibrations of the subject surface.

Further, the present arrangement is economical to manufacture, since the first and second measuring beams are prepared by a combination of a truncated conical lens and an objective lens, which are considerably less expensive than the conventionally used double-focus lens. The central circular flat surface of the truncated conical lens contributes to forming the first measuring beam for irradiating the minute center spot, and the conical surface of the truncated conical lens contributes to forming the second measuring beam for irradiating the annular spot around the minute center spot.

The parallel rays of light incident upon the truncated conical lens and objective lens for preparing the first and second measuring beams may be prepared from a laser beam which is generated by a suitable laser light source and whose frequency is shifted by a first optical frequency modulator. In this case, the reference beam is prepared by a second optical frequency modulator, which shifts the frequency of the laser beam by an amount different from the amount of shifting by the first frequency modulator. The second optical assembly for producing the beat beams may include combining means for combining the reference beam with the first and second measuring beams reflected by the surface of the subject and transmitted through the truncated conical lens and the objective lens, and thereby producing the two beat beams.

In the above form of the invention, the first and second optical assemblies may include a first and a second beam expander, respectively. The first beam expander is adapted to enlarge a diameter of a first component of the laser beam whose frequency has been shifted by the first optical frequency modulator, so that the expanded first laser beam provides the parallel rays of light. The second beam expander is adapted to enlarge a diameter of a second component of the laser beam whose frequency has been shifted by the second optical frequency modulator, so that the expanded second component provides parallel rays of the reference beam.

The laser light source may be adapted to generate a linearly polarized laser beam which is converted into the first and second measuring beams by the first optical assembly. In this case, the combining means of the second optical assembly comprises a polarizing beam splitter, and a $\frac{1}{4}$ retardation plate disposed between the polarizing beam splitter and the surface of the subject, for permitting the polarizing beam splitter to substantially completely separate the first and second measuring beams reflected from the surface, from the linearly polarized laser beam which is incident upon the polarizing beam splitter.

Alternatively, the parallel rays of light may be prepared from a laser beam consisting of a first and a second component which have mutually perpendicular polarization planes and different frequencies. In this instance, a beam expander is provided for enlarging a diameter of the first and second components of the laser beam, so that the expanded first component of the laser beam provides parallel rays of an irradiating beam incident upon the surface of the subject through the truncated conical and objective lens for providing the first and second measuring beams, while the expanded second component provides parallel rays of the reference beam. Further, the first and second optical assemblies use a polarizing beam splitter for separating the reference beam from the irradiating beam, and for separating the first and second measuring beams reflected from the surface of the subject from the irradiating beam travelling toward the subject surface. The beam splitter combines the first and second measuring beams with the reference beam, to thereby produce the respective two beat beams.

The second optical assembly may further include a mirror which has an aperture formed therethrough and which separates the two beat beams from each other. The converting means may use two photodetectors which respectively receive the two beat beams separated by the mirror and which convert the two beat beams into the respective two electrical beat signals. The aperture formed through the mirror may be an elliptical hole formed in a central part of the mirror.

The apparatus may include a stationary portion and a movable sensing portion which are optically connected by optical fibers. More specifically, the laser light source and the photodetectors of the converting means are included in the stationary portion, while all components of the first optical assembly except the laser light source, and the second optical assembly are included in the movable sensing portion, and are accommodated in a housing which is movable relative to the surface of the subject. The laser beam generated by the laser light source in the stationary portion is propagated into the housing of the movable sensing portion, through a polarization preserving optical fiber which maintains the polarization planes of the first and second components of the laser beam. On the other hand, the two beat beams are propagated from the housing to the two photodetectors in the stationary portion, through respective two optical fibers.

The surface height variation of the subject may be determined by the determining means, by integrating the phase difference of the two electrical beat beams during a predetermined time length.

DETAILED DESCRIPTION OF THE PREFERRED EMBODIMENTS

Figure 1:
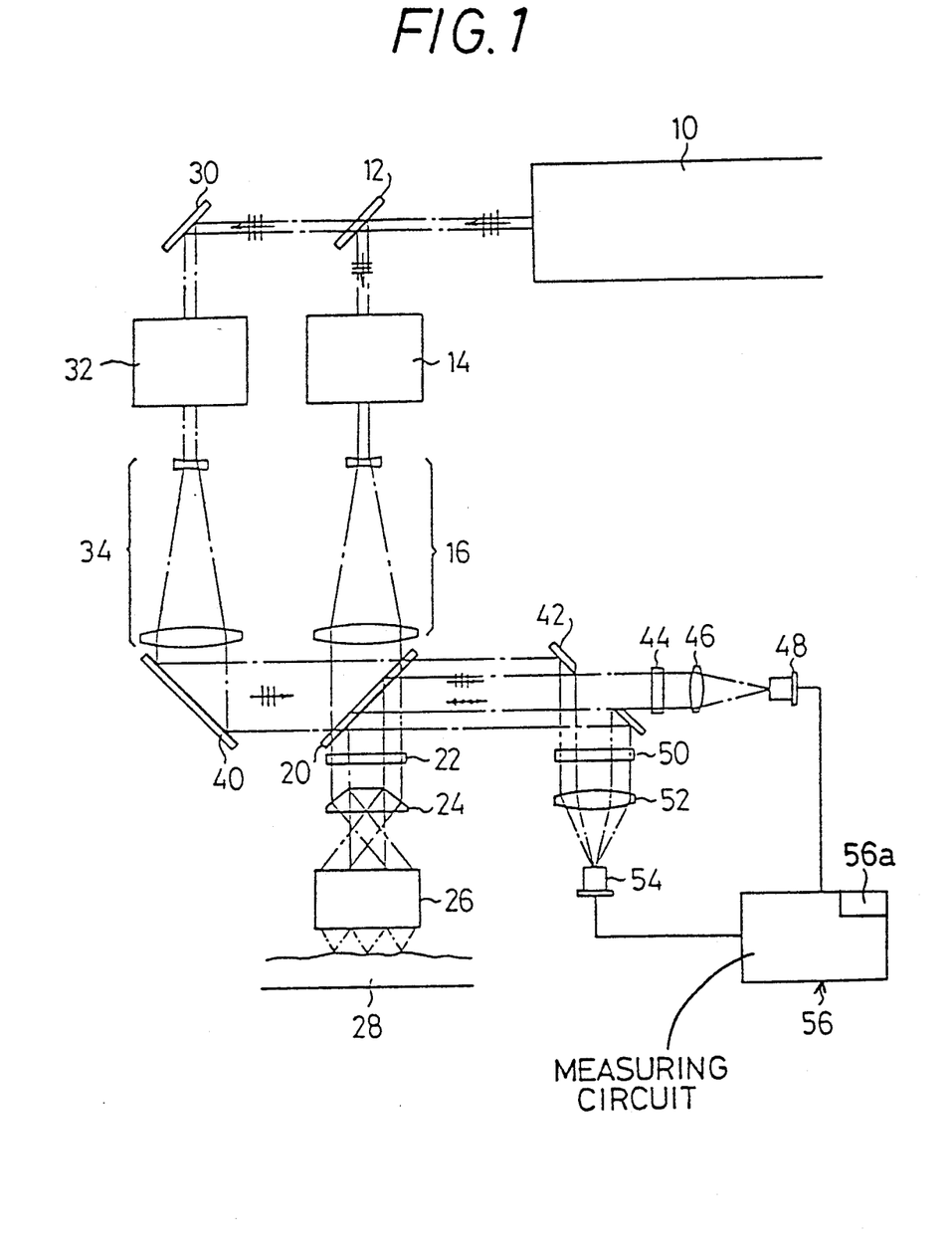
FIG. 1 is a schematic view showing one embodiment of a surface roughness measuring apparatus of the present invention.

Referring first to FIG. 1, there is illustrated an apparatus constructed according to one embodiment of the invention for measuring the roughness or height variation of a surface of a subject. The apparatus uses a laser light source 10 such as a He-Ne (helium-neon) laser source, which generates a monochromatic linearly polarized laser beam and which is oriented with respect to the optic axis such that the polarization plane of the laser beam is parallel to the plane of FIG. 1. In the drawings of FIGS. 1 and 2, the laser beam whose polarization plane is parallel to the plane of the drawings is indicated by , while the laser beam whose polarization plane is orthogonal to the plane of the drawings is indicated by .

The laser beam generated by the laser light source 10 is split by a beam splitter 12 into two components for measuring and reference beams, respectively. That is, the measuring beam reflected by the beam splitter 12 is subjected to frequency modulation by an acousto-optical frequency modulator 14, so that the frequency $f_0$ of the laser beam as generated by the source 10 is shifted by $f_1$ by the modulator 14. The frequency-modulated laser beam is incident upon a beam expander 16, whereby the diameter of the laser beam is enlarged. The expanded laser beam is then transmitted through a polarizing beam splitter 20, and is converted into a circularly polarized beam by a ¼ retardation plate 22. The circularly polarized laser beam is incident upon a truncated conical lens 24. As described later in detail by reference to FIG. 4, the circularly polarized laser beam transmitted through the truncated conical lens 24 is divided into a first measuring beam, and a second measuring beam which has an annular transverse cross sectional shape whose center lies on the center of the first measuring beam. These first and second measuring beams are incident upon a surface of a subject 28 through a microscope objective lens 26, such that a minute spot having an extremely small area on the subject surface is irradiated by the first measuring beam, while an annular spot which surrounds the minute spot in concentric relation therewith and has a diameter of about 100 μm is irradiated by the second measuring beam. The extremely small area of the minute spot corresponds to the resolution limit of the microscope objective lens 26.

The first and second measuring beams which are reflected by the surface of the subject 28, i.e., by the minute and annular spots travel in the reverse direction toward the polarizing beam splitter 20. When the measuring beams are transmitted through the ¼ retardation plate 22 in the reverse direction, the beams are converted into linearly polarized beams whose polarization planes are rotated by 90° with respect to the polarization plane of the laser beam which was incident upon the plate 22 in the forward direction toward the subject surface. Namely, the polarization planes of the linearly polarized first and second measuring beams transmitted through the ¼ retardation plate 22 are perpendicular to the plane of FIG. 1. The measuring beams are then reflected by the polarizing beam splitter 20 toward a reflecting mirror 42. This mirror 42 is inclined by 45° with respect to the optic axis of the measuring beams from the splitter 20, and has a 45° elliptical hole in a central part thereof.

The component of the linearly polarized laser beam which is transmitted through the beam splitter 12 is reflected by a reflecting mirror 30 toward an acousto-optical frequency modulator 32. The frequency $f_0$ of the component incident upon the modulator 32 is shifted by $f_2$ by the modulator 32. The amount of frequency shift $f_2$ by the second modulator 32 is different from $f_1$ of the first modulator 14. The frequency modulated beam is expanded by a beam expander 34. The expanded beam is then reflected by a reflecting mirror 40 and is incident upon the polarizing beam splitter 20, as the reference beam. Since the polarization plane of the reference beam is parallel to the plane of FIG. 1, this reference beam is transmitted through the polarization beam splitter 20, and the optic axis of the reference beam transmitted through the splitter 20 is parallel to the optic axes of the first and second measuring beams reflected by the splitter 20.

The first measuring beam is passed through the 45° elliptical hole of the reflecting mirror 42, together with a portion of the reference beam. The first measuring beam and the portion of the reference beam which have passed through the elliptical hole of the mirror 42 are incident upon a polarizer 44 which is oriented with respect to the optic axis such that the polarizing plane of the polarizer 44 is inclined 45° with respect to the plane of FIG. 1, that is, with respect to the mutually perpendicular polarization planes of the first measuring beam and reference beam. Therefore, portions of the two interfering beams incident upon the polarizer 44 are transmitted through the polarizer 44, and a beat beam having a beat frequency $(f_1-f_2)$ is incident upon a converging lens 46, so that the beat beam is converged on a photodetector 48, so that the photodetector 48 converts the received beat beam into a corresponding electrical beat signal.

The second measuring beam reflected by the polarizing beam splitter 20 is reflected by the reflecting mirror 42 toward a polarizer 50, together with the remaining component of the reference beam. The polarizer 50 is oriented in the same manner as the polarizer 44, so that portions of the two interfering beams incident upon the polarizer 50 are transmitted through the polarizer 50, as a beat beam having a beat frequency $(f_1-f_2)$ which is converged by a converging lens 52 on a photodetector 54. The beat beam received by the photodetector 54 is converted into a corresponding electrical beat signal.

The two electrical beat signals having the frequency of $(f_1-f_2)$ produced by the photodetectors 48, 54 are applied to a measuring circuit 56 which includes a phase difference detector 56a. The phase difference between the two electrical beat signals during a predetermined length of time is integrated by the phase difference detector 56a, as described below in detail.

In the present embodiment, the laser light source 10, beam splitter 12, frequency modulator 14, beam expander 16, truncated conical lens 24 and objective lens 26 constitute a first optical assembly for producing the first measuring beam for irradiating an extremely small or minute spot on the surface of the subject 28, and the second measuring beam for irradiating the annular spot surrounding the minute center spot. Further, the beam splitter 12, mirror 30, frequency modulator 32, beam expander 34, mirror 40, polarizing beam splitter 20, ¼ retardation plate 22, reflecting mirror 42, polarizers 44, 50 and converging lenses 46, 52 constitute a second optical assembly for preparing the reference beam, and combining the reference beam with the first and second measuring beams reflected by the subject surface, so as to produce the two beat beams. Further, the photodetectors 48, 54 function as means for converting the beat beams into corresponding electrical beat signals, while the measuring circuit 56 functions as means for determining the surface height variation of the subject 28, based on the phase difference between the two beat signals.

Figure 4:
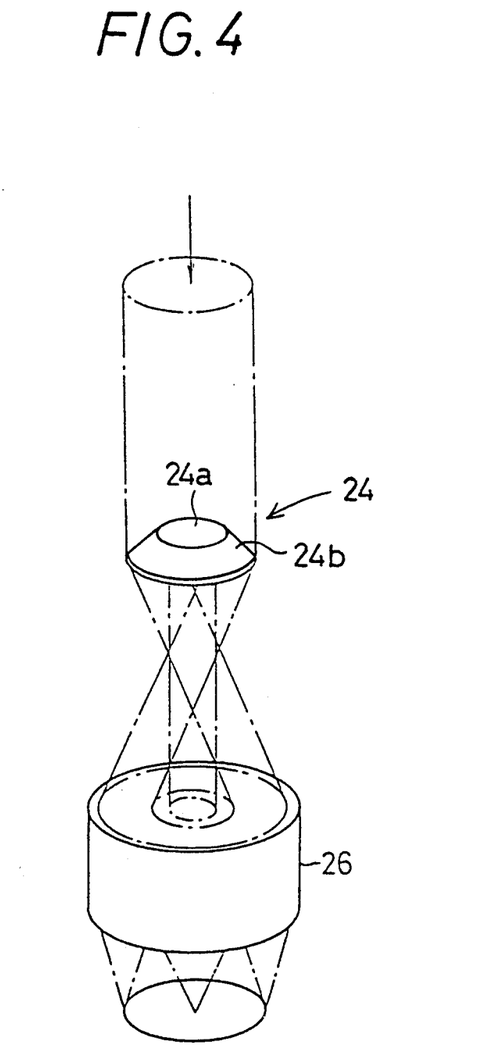
FIG. 4 is a perspective view illustrating a truncated conical lens and an objective lens which are used in the embodiments of the FIGS. 1-3.

Referring also to FIG. 4, there will be described the truncated conical lens 24, and an operation of the present surface roughness measuring apparatus.

The truncated conical lens 24 has a central circular flat top surface 24a, and a conical surface 24b which extends from the periphery of the circular flat top surface 24a. The circularly polarized beam obtained by transmission of the linearly polarized laser beam through the ¼ retardation plate 22 in the direction toward the subject 28 is incident upon the central circular flat top surface 24a and conical surface 24b of the truncated conical lens 24. More specifically, the central portion of the incident circularly polarized beam is incident upon the central circular flat top surface 24a, and is transmitted through the lens 24 as the first measuring beam having a diameter equal to that of the top surface 24a. The peripheral annular portion of the circularly polarized beam is incident upon the conical surface 24b of the lens 24, and is transmitted through the lens 24 as the second measuring beam, which expands as a conic section toward the objective lens 26. This conic section has an optic axis aligned with the optic axis of the first measuring beam.

The first and second measuring beams thus emitted from the truncated conical lens 24 are incident upon the microscope objective lens 26 which is corrected to minimize the aberration for parallel rays of light. The parallel rays of the measuring beams are converged on the focal plane of the objective lens 26. Since the objective lens 26 is positioned relative to the subject 28 such that the subject surface is placed in the focal plane of the lens 26, the first measuring beam irradiates a minute spot (corresponding to the resolution limit of the lens 26) on the subject surface, while the second measuring beam irradiates an annular spot which is concentric with the small spot and which surrounds the small spot.

The frequency of the first measuring beam reflected by the minute spot on the subject surface is expressed by the following formula (1):

$$f_0 + f_1 + f_{B(t)} + 2 \cdot \frac{1}{\lambda} \cdot \frac{d\phi(x)}{dx} \cdot \frac{dx}{dt} \quad (1)$$

where, $\lambda$: wavelength of the laser beam as produced by laser light source 10
$f_1$: amount of frequency shift by modulator 14 (constant)
$f_{B(t)}$: amount of frequency change due to mechanical vibrations of the subject surface, as a function of time
$\phi(x)$: surface height variation of subject 28, as a function of a value x representative of the position on the subject surface $\frac{dx}{dt}$: speed of scanning of the subject surface The value "2" in the fourth term of the above formula (1) is inserted since the value two times the surface height variation represents a change in the optical path length over which the first measuring beam travels to the subject surface in one direction and the reflected first measuring beam travels from the subject surface in the opposite direction.

The frequency of the second measuring beam reflected by the annular spot on the subject surface is expressed by the following formula (2):

$$f_0 + f_1 + f_{B(t)} + 2 \cdot \int \frac{1}{\lambda} \cdot \frac{d\phi(x)}{dx} \cdot \frac{dx}{dt} \cdot dx \quad (2)$$

In the above formula, the fourth term for integration of the surface height variation in the annular spot on the subject surface is usually substantially zero since the variation values in the individual local areas in the annular spot are averaged to zero, if the subject surface is a comparatively smooth surface or does not have an extremely large local height difference.

The frequency of the reference beam is equal to $(f_0-f_2)$, and the frequency of the electrical beat signal produced by the photodetector 48 based on the beat beam produced by interference between the reference and first measuring beams is expressed by the following formula (3):

$$f_1 - f_2 + f_{B(t)} + 2 \cdot \frac{1}{\lambda} \cdot \frac{d\phi(x)}{dx} \cdot \frac{dx}{dt} \quad (3)$$

Similarly, the frequency of the electrical beat signal produced by the photodetector 54 based on the beat beam produced by interference between the reference and second measuring beams is expressed by the following formula (4):

$$f_1 - f_2 + f_{B(t)} \quad (4)$$

The phase difference detector 56a of the measuring circuit 56 is adapted to determine the phase difference between the two electrical beat signals received from the photodetectors 48, 54, by integrating the phase difference during a time length between $t_1$ and $t_2$, according to the following formula (5):

$$\int_{t_1}^{t_2} 2 \cdot \frac{1}{\lambda} \cdot \frac{d\phi(x)}{dx} \cdot \frac{dx}{dt} \cdot dt = 2 \cdot \frac{1}{\lambda} \cdot [\phi(x_2) - \phi(x_1)] \quad (5)$$

where, $x_1$: position on the subject surface at time $t_1$
$x_2$: position on the subject surface at time $t_2$ It will be understood from the formula (5) that the determination of the surface height variation at position $x_2$ from the value at position $x_1$ is not influenced by the frequency change $f_{B(t)}$ due to the mechanical vibration of the subject surface. Thus, the surface height variation can be accurately measured by the present apparatus, without an influence of the mechanical vibrations during the measurement.

Figure 2:
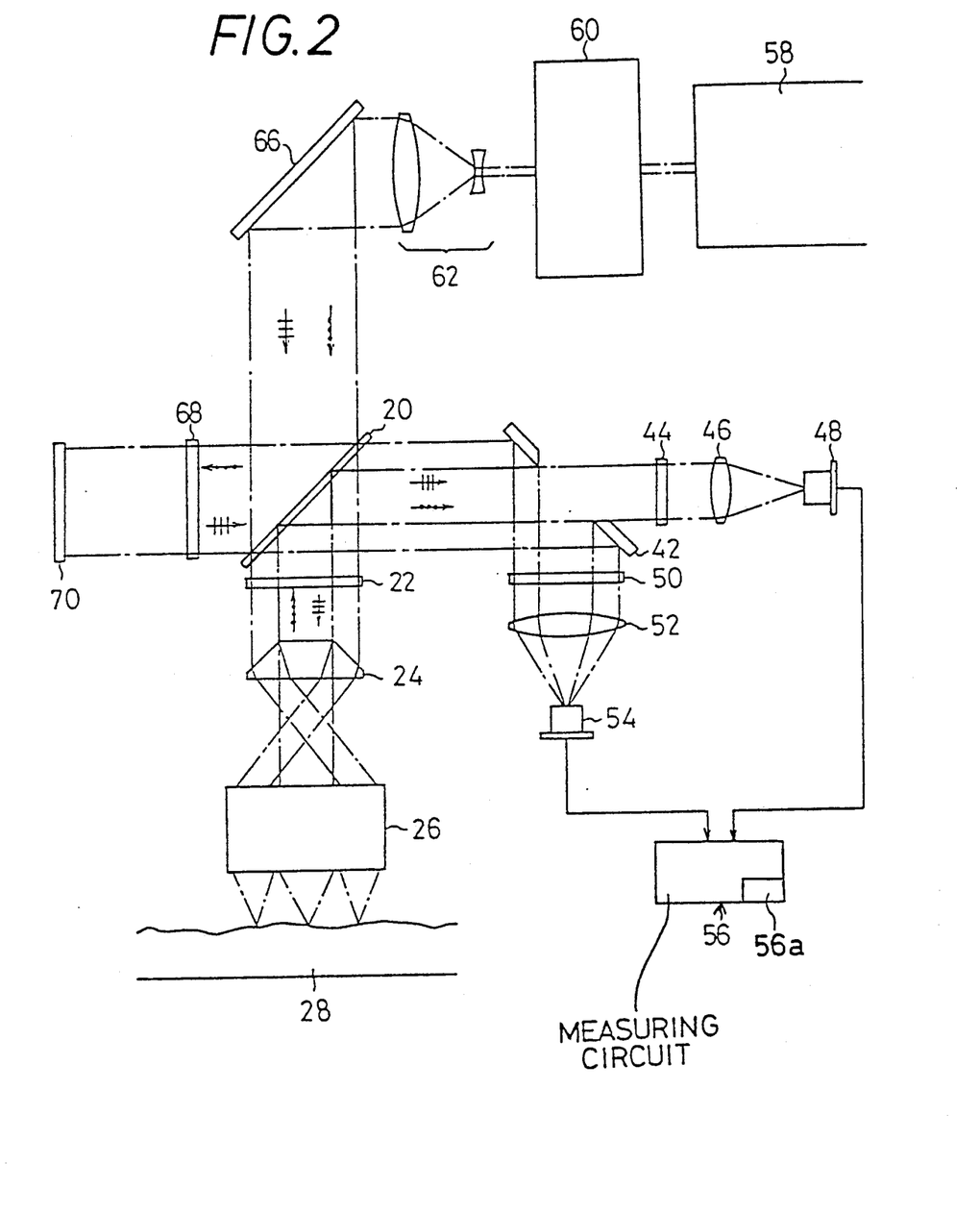
FIG. 2 is a schematic view showing another embodiment of the invention.

Referring next to FIG. 2, there will be described a second embodiment of the present invention, in which a laser light source 58 generates a laser beam consisting of orthogonally-polarized components (with the mutually perpendicular polarization planes) which have slightly different frequencies. The laser beam is transmitted through an acousto-optical frequency modulator 60, and the diameter of the frequency modulated laser beam is expanded by a beam expander 62. The expanded laser beam is then reflected by a reflecting mirror 66 toward the polarizing beam splitter 20. The orthogonally-polarized components having different frequencies are separated from each other by the beam splitter 20. The component transmitted through the beam splitter 20 provides parallel rays from which the first and second measuring beams are prepared in the same manner as in the embodiment of FIG. 1.

The other component of the laser beam which is reflected from the beam splitter 20 provides the reference beam, which is transmitted through a ¼ retardation plate 68 and then reflected by a reflecting mirror 70. The reference beam reflected by the mirror 70 is re-transmitted through the ¼ retardation plate 68 and is converted into the linearly polarized beam whose polarization plane is rotated by 90° with respect to that of the beam which was incident upon the plate 68 in the direction toward the mirror 70. Therefore, the reference beam re-transmitted through the plate 68 in the direction toward the beam splitter 20 is transmitted through the beam splitter 20, so that the optic axis of the reference beam is parallel to the optic axes of the first and second measuring beams which are reflected by the beam splitter 20 toward the reflecting mirror 42. The reference and measuring beams are subsequently processed in the same manner as in the first embodiment of FIG. 1.

It is noted that a portion of the laser beam which is reflected by a surface of the lens of the beam expander 62 toward the laser light source 58 does not influence the light source 58, since the reflected portion of the laser beam is frequency modulated by the modulator 60.

Figure 3:
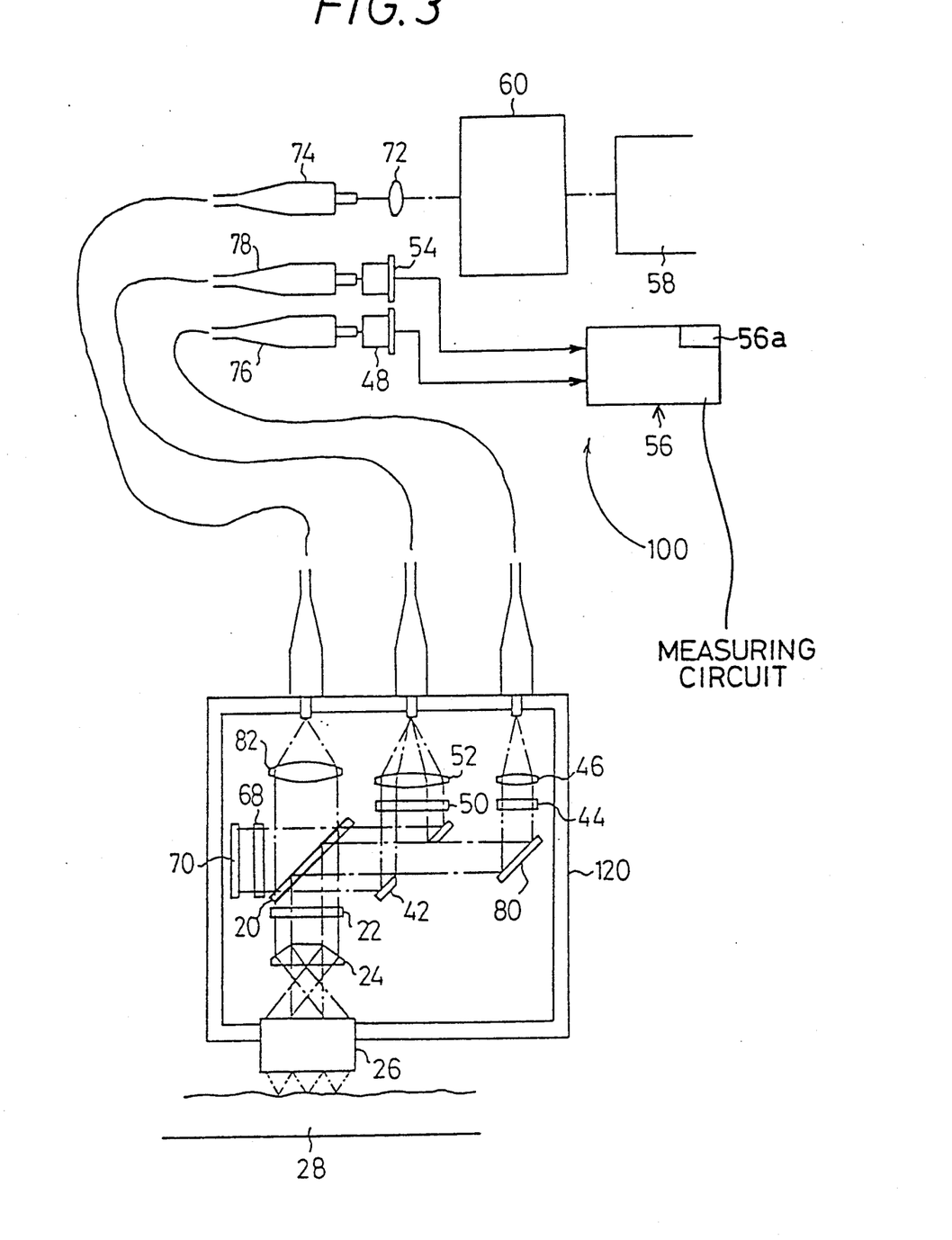
FIG. 3 is a schematic view showing a further embodiment of the invention.

A further modified embodiment of the invention is illustrated in FIG. 3. This embodiment utilizes optical fibers 74, 76, 78 for flexibly optically connecting two portions of the apparatus according to the second embodiment of FIG. 2. More particularly described, the present modified surface roughness apparatus includes a stationary light emitting/receiving portion, and a movable optical sensing head portion 120 which is movable relative to the subject 28. The laser beam generated by the laser light source 58 and frequency modulated by the modulator 60 is converged by a converging lens 72 at one end of an optical fiber 74 of polarization preserving type. The optical fiber 74 is oriented with respect to the optic axis such that the two orthogonally-polarized components of the laser beam are propagated through the optical fiber 74, as respective modes $HE_{11}x$ and $HE_{11}y$ whose polarization planes are perpendicular to each other. The optical fiber 74 is capable of maintaining the polarization planes of the two modes. The other end of the optical fiber 74 is fixed to a housing of the sensing head portion 120, such that the laser beam emitted from the relevant end of the fiber 74 is incident upon a converging lens 82 fixedly accommodated in the movable sensing head portion 120. The parallel rays emitted from the converging lens 82 are subsequently processed in the same manner as in the embodiment of FIG. 2, to prepare the first and second measuring beams. The beat beams converged by the respective converging lenses 46, 52 in the sensing head portion 120 are incident upon the ends of respective optical fibers 76, 78 (single-mode or multiple-mode fibers) fixed to the housing of the head portion 120, and transmitted through the optical fibers 76, 78 to the respective photodetectors 48, 54 in the stationary light emitting/receiving portion 100. The beat beams received by the photodetectors 48, 54 are converted into respective electrical beat signals which are applied to the measuring circuit 56 incorporated in the stationary light emitting/receiving portion 100.

While the present invention has been described in its presently preferred embodiments with a certain degree of particularity, it is to be understood that the invention is not limited to the details of the illustrated embodiments, but may be embodied with various changes, modifications and improvements, which may occur to those skilled in the art, without departing from the spirit and scope of the invention defined in the appended claims.

For instance, the truncated conical lens 24 may be positioned such that the central circular flat top surface 24a faces the objective lens 26. If the objective lens 26 is not corrected to minimize the aberration for parallel rays of light, the truncated conical lens 24 with the central circular flat top surface 24a may be formed with a curved bottom surface whose curvature is determined depending upon the objective lens 26.

What is claimed is:

1. A method of measuring a roughness of a surface of a subject, comprising the steps of:

disposing a truncated conical lens and an objective lens in series with each other along an optical path, said truncated conical lens having a central circular flat surface and a conical surface which extends from a periphery of said central circular flat surface;

generating and directing parallel rays of light such that the parallel rays of light are transmitted through said truncated conical lens and said objective lens and are thereby converted into a first measuring beam which irradiates a minute spot on said surface of the subject, and a second measuring beam which irradiates an annular spot which surrounds said minute spot;

generating a reference beam having a frequency different from that of said first and second measuring beams, and directing said reference beam such that said reference beam interferes with each of said first and second measuring beams reflected by said surface of the subject, so as to produce two beat beams;

converting said two beat beams into respective two electrical beat signals; and determining a height variation of said surface of said subject, based on a phase difference between said two electrical beat signals.

2. An apparatus for measuring a roughness of a surface of a subject, comprising:

a first optical assembly including means for generating parallel rays of light, a truncated conical lens which has a central circular flat surface, and a conical surface which extends from a periphery of said central circular flat surface of said truncated conical lens, and an objective lens disposed in series with said truncated conical lens, said first optical assembly being disposed such that said parallel ray of light are transmitted through said truncated conical lens and said objective lens and are thereby converted into a first measuring beam for irradiating a minute spot on said surface of the subject, and a second measuring beam for irradiating an annular spot which surrounds said minute spot;

a second optical assembly including means for preparing a reference beam having a frequency different from that of said first and second measuring beams, said second optical assembly causing said reference beam to interfere with each of said first and second measuring beams reflected from said surface of the subject, so as to produce two beat beams;

converting means for converting said two beat beams into respective two electrical beat signals; and determining means including a phase difference detector for detecting a phase difference between said two electrical beat signals, said determining means determining a height variation of said surface of the subject, based on said phase difference.

3. An apparatus according to claim 2, wherein said determining means determines said height variation by integrating said phase difference during a predetermined time length.

4. An apparatus according to claim 2, wherein said means for generating parallel rays of light of said first optical assembly comprises a laser light source for generating a laser beam, and a first optical frequency modulator for shifting a frequency of said laser beam by a first amount.

5. An apparatus according to claim 4, wherein said means for preparing a reference beam of said second optical assembly comprises a second optical frequency modulator for shifting the frequency of said laser beam by a second amount different from said first amount, and thereby producing said reference beam, said second optical assembly further including combining means for combining said reference beam with said first and second measuring beams which have been reflected by said surface of the subject and transmitted through said truncated conical lens and said objective lens, thereby producing said two beat beams.

6. An apparatus according to claim 5, wherein said means for generating parallel rays of light of said first optical assembly further comprises a first beam expander for enlarging a diameter of a first component of said laser beam whose frequency has been shifted by said first optical frequency modulator, so that the expanded first laser beam provides said parallel rays of light, and said means for preparing a reference beam of said second optical assembly further comprises a second beam expander for enlarging a diameter of a second component of said laser beam whose frequency has been shifted by said second optical frequency modulator, so that the expanded second component provides parallel rays of said reference beam.

7. An apparatus according to claim 5, wherein said laser light source generates a linearly polarized laser beam which is converted into said first and second measuring beams by said first optical assembly, and said combining means of said second optical assembly comprises a polarizing beam splitter, and a ¼ retardation plate disposed between said polarizing beam splitter and said surface of the subject, for permitting said polarizing beam splitter to substantially completely separate said first and second measuring beams reflected from said surface from said linearly polarized laser beam which is incident upon said polarizing beam splitter.

8. An apparatus according to claim 2, wherein said means for generating parallel rays of light of said first optical assembly comprises a laser light source for generating a laser beam consisting of a first and a second component which have mutually perpendicular polarization planes and different frequencies, and wherein said means for generating parallel rays of light and said means for preparing a reference beam comprise a beam expander for enlarging a diameter of said first and second components of said laser beam, so that the expanded first component of said laser beam provides parallel rays of an irradiating beam incident upon said surface of the subject through said truncated conical and objective lens for providing said first and second measuring beams, while the expanded second component provides parallel rays of said reference beam, said first and second optical assemblies comprise a polarizing beam splitter for separating said reference beam from said irradiating beam, separating said first and second measuring beams reflected from said surface of the subject from said irradiating beam travelling toward said surface, and combining said first and second measuring beams with said reference beam for interference therebetween.

9. An apparatus according to claim 8, wherein said converting means includes two photodetectors which receive said two beat beams and convert the received beat beams into said respective two electrical beat signals, and wherein said laser light source and said photodetectors are stationary, while all components of said first optical assembly except said laser light source, and said second optical assembly are accommodated in a housing which is movable relative to said surface of the subject, said apparatus further comprising a polarization preserving optical fiber through which said laser beam is propagated from said laser light source into said housing, and two optical fibers through which said two beat beams are propagated from said housing to said two photodetectors, respectively.

10. An apparatus according to claim 2, wherein said second optical assembly further includes a mirror which has an aperture formed therethrough and which separates said two beat beams from each other, and said converting means comprises two photodetectors which respectively receive said two beat beams separated by said mirror and which convert said two beat beams into said respective two electrical beat signals.

11. An apparatus according to claim 10, wherein said aperture formed through said mirror is an elliptical hole formed in a central part of said mirror.

* * * * *